Patented May 23, 1950

2,509,191

UNITED STATES PATENT OFFICE 2,509,191

PHARMACEUTICALS AND METHOD OF PREPARING THEM

William A. Lott, Maplewood, Jack Bernstein, New Brunswick, and Morris A. Dolliver, Stelton, N. J., assignors to E. R. Squibb & Sons, New York, N. Y., a corporation of New York No Drawing. Application February 21, 1947, Serial No. 730,198

14 Claims. (Cl. 260—210)

This invention relates to pharmaceuticals; and it has for its object the provision of advantageous pharmaceuticals essentially comprising combinations of certain antibiotics and certain chemotherapeutic agents, and a method of obtaining such pharmaceuticals.

The pharmaceuticals of this invention essentially comprise a salt-type combination of a basic antibiotic of the streptomycin type and a chemotherapeutic p-aminomethyl-benzene-sulfonamide (especially homosulfanilamide). These salt-type combinations have been found to have both the chemotherapeutic action of the p-aminomethyl-benzene-sulfonamide component and the antibiotic action of the streptomycin-type component, and, in addition, certain chemical and/or physical properties advantageously utilizable in therapy.

The term "a p-aminomethyl-benzene-sulfonamide," as employed herein, means a member of the genus composed of homosulfanilamide [otherwise known as α-amino-p-toluene-sulfanilamide] and its derivatives. This genus comprises compounds described in U. S. Patent 2,288,531, dated June 30, 1942; i. e., compounds of the following formula:

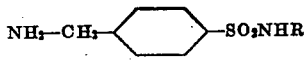

wherein R is a member of the class consisting of hydrogen, alkyl, phenylalkyl, hydroxyalkyl, alkoxyalkyl, carboxylic acid acyl, and heterocyclic groups. Thus, the genus comprises such compounds as: homosulfanilamide; 2-(p-amino-methyl - benzene - sulfonamido) - pyridine; 2-(p - aminomethyl - benzene - sulfonamido) - thiazole; 2-(p-aminomethyl-benzene-sulfonamido) - pyrimidine; and 2-(p-aminomethyl-benzene-sulfonamido)-4,6-dimethyl-pyrimidine.

The expression "a basic antibiotic of the streptomycin type" means a member of the genus composed of the basic antibiotic streptomycin and antibiotically-active basic compounds which (like streptomycin) are capable of forming water-soluble salts with acids such as sulfuric and water-insoluble salts with organic-base precipitating reagents (e. g., derivatives of streptomycin such as dihydrostreptomycin, and similarly-acting antibiotics, such as streptothricin).

The method of this invention essentially comprises: interacting in an aqueous medium (1) a water-soluble salt obtained by reacting a basic antibiotic of the streptomycin type with an acid and (2) a water-soluble salt obtained by reacting a p-aminomethyl-benzene-sulfonamide with an alkali, the cation of the alkali and the anion of the acid being selected from those forming water-insoluble salts with each other; separating the precipitated salt; and, if desired, recovering from its aqueous solution the formed salt-type combination of the p-aminomethyl-benzene-sulfonamide and the basic antibiotic of the streptomycin type. Alternatively, the reaction mixture (either before or after separation of the precipitated salt) is substantially neutralized with a strong polybasic acid (e. g., phosphoric or sulfuric acid); the product thus obtained being believed to be a salt-type combination in which the basic antibiotic of the streptomycin type and the p-aminomethyl-benzene-sulfonamide are contained in the same molecule but linked together through the polybasic acid. The preferred salts of the p-aminomethyl-benzene-sulfonamide and the basic antibiotic of the streptomycin type are, respectively, the barium salt and the sulfate.

The aqueous solution of the salt-type combination initially obtained (i. e., the neutralized or unneutralized reaction mixture, after separation of the precipitate and suitable adjustment of the concentration), or the product recovered from aqueous solution, may be therapeutically used as such, inasmuch as any excess or unreacted components of the reaction mixture would not interfere with such use. Any excess or unreacted component in the product may be removed by suitably adjusting the pH of an aqueous solution thereof (e. g., with barium hydroxide or sulfuric acid); filtering the solution, and drying (preferably freeze-drying) the filtrate.

A thus-obtained salt-type combination of streptomycin and homosulfanilamide, for example, has both the antibiotic action of streptomycin and the chemotherapeutic action of homosulfanilamide. The salt is especially suitable for the topical treatment of infected traumatized areas, being active against the following organisms, inter alia: Gram-positive bacteria, e. g., *Staphylococcus aureus;* Gram-negative bacteria, e. g., *Klebsiella pneumoniae* (Friedländer bacillus); and acid-fast bacteria, e. g., *Mycobacterium tuberculosis* (variety *hominis*).

The basic antibiotic of the streptomycin type employed in the practice of this invention may be either pure or crude, and either naturally (mold) derived or synthetic. Preferably, the crude antibiotic is of such purity as to the therapeutically utilizable per se. A cruder antibiotic may be employed, however, where the impurities and the p-aminomethyl-benzene-sulfonamide component interact to form a water-insoluble product (removable with the precipitate formed by the primary reaction).

The following examples are illustrative of the invention:

EXAMPLE 1

*Preparation of a streptomycin salt of homosulfanilamide*

A solution of "barium homosulfanilamide" is prepared by dissolving homosulfanilamide in saturated barium hydroxide solution (0.456 normal), in the proportion of 9.3 g. homosulfanilamide to 100 cc. of the barium hydroxide solution; 10 g. of highly purified streptomycin sulfate having a potency of 586 units/mg. (obtained, for example, as described in the application of Wintersteiner and Fried, Serial No. 666,541, filed May 1, 1946, now Patent No. 2,501,014 dated March 21, 1950) is dissolved in 100 cc. distilled water; and the solution of barium homosulfanilamide is added to the solution of streptomycin sulfate (pH 4.1) until complete precipitation is obtained (about 100 cc. of the first solution being required). The mixture is then centrifuged; 3.686 N sulfuric acid is added to pH 6.5 (about 23.75 cc. being required, and no further precipitation of barium sulfate occurring during the addition); the acidified mixture is filtered; and the filtrate is freeze-dried (yield, 17.87 g.). The salt-type combination of streptomycin and homosulfanilamide thus obtained has a potency of 304 units/mg., and yields a clear 10% aqueous solution of pH 6.38. [Though (properly) termed a salt-type combination of streptomycin and homosulfanilamide, this product is believed to be a streptomycin-and-homosulfanilamide salt of sulfuric acid, i. e., the streptomycin and homosulfanilamide are linked together through sulfuric acid (the latter being introduced by the pH adjustment with sulfuric acid); but it is not intended that the invention be limited by any theoretical explanations.]

EXAMPLE 2

*Alternative preparation of a streptomycin salt of homosulfanilamide*

The procedure described in Example 1 is modified by eliminating the pH adjustment step with sulfuric acid. The streptomycin salt of homosulfanilamide thus obtained (in a yield of 15.2 g.) has a potency of 338 units/mg., and yields a clear 5% aqueous solution of pH 10.2 or a slightly turbid 10% aqueous solution of pH 9.98. The "recovery" of streptomycin is about 90%.

EXAMPLE 3

*Preparation of a dihydrostreptomycin salt of homosulfanilamide*

2 g. dihydrostreptomycin sulfate (cf. Fried and Wintersteiner application Serial No. 668,482, filed May 9, 1946) is dissolved in 20 cc. distilled water (pH of solution, 6.0), and the solution of barium homosulfanilamide described in Example 1 is added until complete precipitation is obtained. The resulting mixture is centrifuged and filtered, and the filtrate is freeze-dried (yield, 2.6 g.). The dihydrostreptomycin salt of homosulfanilamide thus obtained has a potency of 413 units/mg., and yields a clear 5% aqueous solution of pH 10.1 or a slightly turbid 10% aqueous solution of pH 9.9. The "recovery" of dihydrostreptomycin is about 88%.

On replacement of the antibiotic sulfate in any of the foregoing examples with a substantially-pure streptothricin sulfate having a potency of 520 units/mg. (obtained, for example, as described in Wintersteiner and Fried application Serial No. 590,973, filed April 28, 1945) or with the sulfate of any other basic antibiotic of the streptomycin type, the salt-type combination of the corresponding-antibiotic and homosulfanilamide is obtained; and on replacement of the barium homosulfanilamide in any of the foregoing examples with the barium salt of any other chemotherapeutic p-aminomethyl-benzene-sulfonamide, the salt-type combination of the corresponding-antibiotic and the p-aminomethyl-benzene-sulfonamide employed is obtained.

The salt-type combinations of this invention are therapeutically utilizable wherever therapy with the p-aminomethyl-benzene-sulfonamide component thereof is indicated (with the advantage of being more generally effective, because active against a wider variety of organisms); especially, wherever therapy with both the p-aminomethyl-benzene-sulfonamide component and the streptomycin-type component is indicated. The salt-type combinations are especially adapted for dusting (in the powder form obtained on freeze-drying) on or into wounds (including burns), and may be mixed for this purpose with the usual inert diluents or carriers (impalpable inert powders), e. g., talc, zinc stearate, or corn starch.

The invention may be variously otherwise embodied within the scope of the appended claims.

We claim:

1. A streptomycin salt of homosulfanilamide.
2. A dihydrostreptomycin salt of homosulfanilamide.
3. The method which comprises interacting in an aqueous medium (1) a water-soluble salt obtained by reacting an antibiotic of the group consisting of streptomycin, dihydrostreptomycin, and streptothricin with an acid and (2) a water-soluble salt obtained by reacting a p-aminomethyl-benzene-sulfonamide with an alkali, the cation of the alkali and the anion of the acid being selected from those forming water-insoluble salts with each other, and separating the precipitate.
4. The method which comprises interacting in an aqueous medium (1) a water-soluble salt obtained by reacting an antibiotic of the group consisting of streptomycin, dihydrostreptomycin, and streptothricin with an acid and (2) a water-soluble salt obtained by reacting a p-aminomethyl-benzene-sulfonamide with an alkali, the cation of the alkali and the anion of the acid being selected from those forming water-insoluble salts with each other, and substantially neutralizing the reaction mixture with a strong polybasic acid.
5. The method which comprises interacting in an aqueous medium a barium salt of a p-aminomethyl-benzene-sulfonamide and a sulfate of an antibiotic of the group consisting of streptomycin, dihydrostreptomycin, and streptothricin and separating the precipitate.
6. The method which comprises interacting in an aqueous medium barium homosulfanilamide and a sulfate of an antibiotic of the group consisting of streptomycin, dihydrostreptomycin, and streptothricin, and separating the precipitate.
7. The method which comprises interacting in an aqueous medium a barium salt of a p-aminomethyl-benzene-sulfonamide and streptomycin sulfate, and separating the precipitate.

8. The method which comprises interacting in an aqueous medium a barium salt of a p-aminomethyl-benzene-sulfonamide and dihydrostreptomycin sulfate, and separating the precipitate.

9. The method which comprises interacting in an aqueous medium barium homosulfanilamide and a sulfate of an antibiotic of the group consisting of streptomycin, dihydrostreptomycin, and streptothricin, and substantially neutralizing the reaction mixture with sulfuric acid.

10. A salt in which an antibiotic of the group consisting of streptomycin, dihydrostreptomycin, and streptothricin is combined with chemotherapeutic p-aminomethyl-benzene-sulfonamide, the former as the cation.

11. A salt in which streptomycin is combined with a chemotherapeutic p-aminomethyl-benzene-sulfonamide, the former as the cation.

12. A salt in which dihydrostreptomycin is combined with a chemotherapeutic p-aminomethyl-benzene-sulfonamide, the former as the cation.

13. A salt in which a chemotherapeutic p-aminomethyl-benzene-sulfonamide and an antibiotic of the group consisting of streptomycin, dihydrostreptomycin, and streptothricin are combined with a strong polybasic acid, the sulfonamide and antibiotic as cations.

14. A salt in which homosulfanilamide and streptomycin are combined with sulfuric acid, the first two as cations.

WILLIAM A. LOTT.
JACK BERNSTEIN.
MORRIS A. DOLLIVER.

REFERENCES CITED

The following references are of record in the file of this patent:

UNITED STATES PATENTS

| Number | Name | Date |
|---|---|---|
| 2,245,539 | Warnat | June 10, 1941 |

OTHER REFERENCES

Howes: J. Am. Med. Assoc., vol. 132 (1946), p. 883, 1 page.

E. H. Northey: Structure and chemotherapeutic activities of sulfanilamide derivatives, pp. 169, 180, Chemical Reviews, vol. 27, #1, August 1940.

Manufacturing Chemist and Manufacturing Perfumer, Oct. 1943, vol. 14, page 321.

Moore et al.: Jour. Biol. Chem., pages 439-440, Oct. 1946.

Thatcher et al.: Journal Urology, pages 902-926, May 1947. Read at annual meeting, American Urological Assoc., Cincinnati, Ohio, July 25, 1946.

Readers Digest, Nov. 1945, page 39.